United States Patent
Sindalovsky et al.

(10) Patent No.: US 7,778,377 B2
(45) Date of Patent: Aug. 17, 2010

(54) METHODS AND APPARATUS FOR SPREAD SPECTRUM GENERATION USING A VOLTAGE CONTROLLED DELAY LOOP

(75) Inventors: Vladimir Sindalovsky, Perkasie, PA (US); Lane A. Smith, Easton, PA (US); Craig B. Ziemer, Fleetwood, PA (US)

(73) Assignee: Agere Systems Inc., Allentown, PA (US)

( * ) Notice: Subject to any disclaimer, the term of this patent is extended or adjusted under 35 U.S.C. 154(b) by 1413 days.

(21) Appl. No.: 11/141,695

(22) Filed: May 31, 2005

(65) Prior Publication Data

US 2006/0268958 A1    Nov. 30, 2006

(51) Int. Cl.
    *H03D 3/24*      (2006.01)
(52) U.S. Cl. .................. 375/376; 375/130; 375/131; 375/133; 375/226; 375/141; 327/113; 327/141; 327/163; 327/146; 327/119; 370/319; 370/335; 370/342; 370/345
(58) Field of Classification Search ............ 375/130, 375/131, 133, 134, 140, 141, 145, 226, 294, 375/371–376, 135, 146; 327/113–119, 141, 327/146–152, 154–157, 163; 370/319–321, 370/335, 342, 345
See application file for complete search history.

(56) References Cited

U.S. PATENT DOCUMENTS

| | | | |
|---|---|---|---|
| 6,600,771 B1 * | 7/2003 | Moon et al. | 375/130 |
| 6,970,029 B2 * | 11/2005 | Patel et al. | 327/261 |
| 2005/0040893 A1 | 2/2005 | Paist et al. | 331/1 |
| 2005/0052211 A1 * | 3/2005 | Jung et al. | 327/277 |

* cited by examiner

*Primary Examiner*—David C Payne
*Assistant Examiner*—Rahel Guarino
(74) *Attorney, Agent, or Firm*—Ryan, Mason & Lewis, LLP

(57) ABSTRACT

Methods and apparatus are provided for generating a frequency with a predefined offset from a reference frequency. A spread spectrum generator circuit is disclosed that comprises a voltage controlled delay loop for generating a plurality of signals having a different phase; and at least one interpolator for processing at least two of the signals to generate an output signal having a phase between a phase of the at least two of the signals, wherein the output is varied between a phase of the at least two of the signals to generate the spread spectrum. A spread spectrum having a frequency lower than an applied clock signal is generated using a continuous phase delay increase and a spread spectrum having a frequency higher than the clock signal is generated using a continuous phase delay decrease.

12 Claims, 2 Drawing Sheets

METHODS AND APPARATUS FOR SPREAD SPECTRUM GENERATION USING A VOLTAGE CONTROLLED DELAY LOOP

FIELD OF THE INVENTION

The present invention relates generally to spread spectrum techniques, and, more particularly, to methods and apparatus for generating a frequency with a predefined offset from a reference frequency.

BACKGROUND OF THE INVENTION

Digital circuits are often employed with one or more clock signals. At high frequencies, however, these digital circuits may radiate signals as electromagnetic energy that may interfere with the operation of surrounding equipment. Since these emissions are based upon clock signals, energy "spikes" often occur at these clock signal frequencies and their harmonic frequencies. Shielding techniques are often employed to reduce these emissions within certain frequency ranges.

In addition, spread spectrum techniques are often employed to spread the emitted energy over a wider frequency range, thereby decreasing the energy at any given frequency. One technique varies the clock frequency over a range of frequencies such that the average frequency is the desired clock frequency, but the emitted energy is now "spread" over the range of frequencies. Such spread spectrum techniques reduce the interference from high energy spikes at the clock frequency.

Clock signals are often generated using a phase-locked loop (PLL) circuit. A PLL circuit generates a periodic output signal that has a constant phase and frequency with respect to a periodic input signal. In a charge-pump PLL, for example, as described in Floyd M. Gardner, "Charge-Pump Phase-Lock Loops," IEEE Trans. Communications, vol. COM-28, 1849-1858 (November 1980), a phase detector compares the phase of an input reference clock signal to the phase of a feedback signal derived from the PLL output. The phase detector generates an UP or DOWN error signal indicating the phase difference.

A charge pump generates a charge based on the error signal, where the sign of the charge indicates the direction of UP or DOWN. The charge is either added to or subtracted from the capacitance in a loop filter, based on whether the error signal was an UP signal or a DOWN signal. The loop filter operates as an integrator that accumulates the net charge from the charge pump. The resulting loop-filter voltage is applied to a voltage-controlled oscillator (VCO). The VCO generates a periodic output signal having a frequency that is a function of the VCO input voltage. Input and feedback dividers may optionally be placed in the input and feedback paths, respectively, if the frequency of the output signal is to be either a fraction or a multiple of the frequency of the input signal.

In one exemplary spread spectrum technique, a clock frequency is varied by modifying the feedback divider used to control the output clock frequency of the PLL. The feedback divider typically divides the output signal of the VCO by a fixed number N to generate a signal close in frequency to the input reference clock signal. By varying the value of N, the divided output of the VCO applied to the phase detector also varies the output frequency of the VCO. Spread spectrum techniques of the prior art typically vary the frequency in discrete steps by reading successive values for N from a table stored in memory and supplying the successive values of N to the feedback divider.

U.S. patent application Ser. No. 10/644,362, entitled "Spectrum Profile Control for a PLL and the Like," incorporated by reference herein, discloses a spread spectrum technique where the spreading of the frequency spectrum of a timing recovery circuit, such as a PLL, is controlled by periodically calculating each value for a divisor, N, of a fractional divider in the feedback path of the PLL. The fractional divider divides the output signal of a VCO of the PLL by the divisor, N, and the value for the divisor, N, is periodically updated based on a spreading profile. The output of the fractional divider and a reference clock signal are provided to a phase detector of the PLL so as to cause the PLL to slew the output frequency of the PLL in accordance with the spreading profile.

While such conventional spread spectrum techniques generate a frequency with a predefined offset from a reference frequency, they suffer from a number of limitations, which if overcome, could further improve the efficiency and utility of spread spectrum techniques. In particular, with such conventional spread spectrum techniques, the VCO output can be used only for the frequency offset or spread spectrum destination. The VCO output cannot be shared with other circuits requiring a constant VCO frequency. A need exists for methods and apparatus for generating a frequency with a predefined offset from a reference frequency that provide predominantly digital spread spectrum or rate offset frequency generation.

SUMMARY OF THE INVENTION

Generally, methods and apparatus are provided for generating a frequency with a predefined offset from a reference frequency. A spread spectrum generator circuit is disclosed that comprises a voltage controlled delay loop for generating a plurality of signals having a different phase; and at least one interpolator for processing at least two of the signals to generate an output signal having a phase between a phase of the at least two of the signals, wherein the output is varied between a phase of the at least two of the signals to generate the spread spectrum.

A spread spectrum having a frequency lower than an applied clock signal is generated using a continuous phase delay increase and a spread spectrum having a frequency higher than the clock signal is generated using a continuous phase delay decrease. Typically, the spread spectrum generator circuit comprises a plurality of the interpolators and each of the interpolators has an associated phase range. A control circuit is also disclosed that generates a triangle wave control signal for the interpolator(s).

A more complete understanding of the present invention, as well as further features and advantages of the present invention, will be obtained by reference to the following detailed description and drawings.

DETAILED DESCRIPTION

Figure 1:
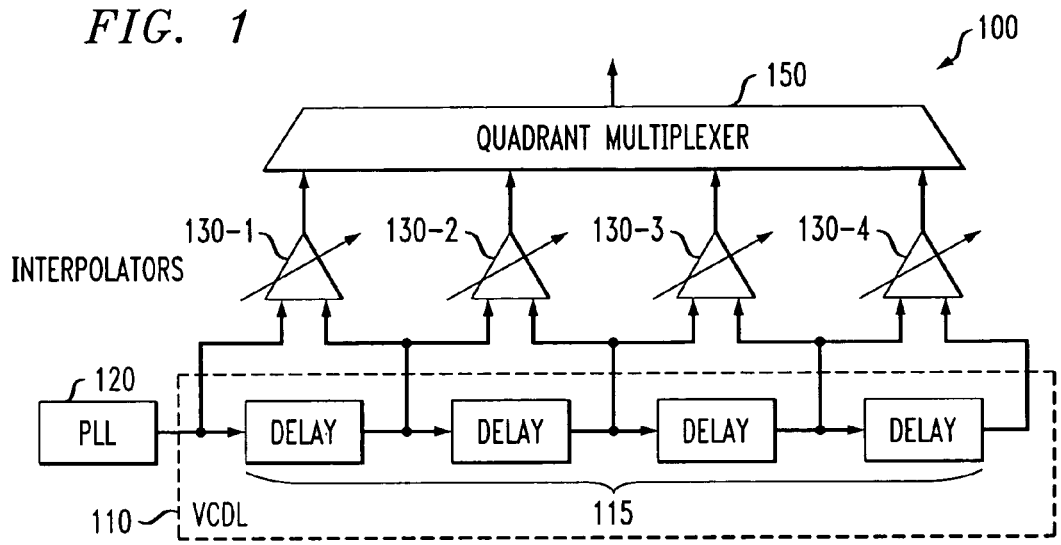
FIG. 1 is a block diagram of a signal generator circuit incorporating features of the present invention.

The present invention provides spread spectrum or constant frequency offset generation based on an interpolation of the phases generated by a voltage controlled delay loop (VCDL). FIG. 1 is a block diagram of a signal generator circuit 100 incorporating features of the present invention. The signal generator circuit 100 employs a VCDL 110 to provide a spread spectrum and constant frequency offset generation. As shown in FIG. 1, the signal generator circuit 100 comprises a PLL 120 that provides a clock source to the VCDL 110, an interpolator bank 130 and a quadrant multiplexer 150. The VCDL 110 is comprised of a bank 115 of delay elements. The output of each delay element 115 is offset from one another by an exemplary phase of 90°.

The multiple phases from the VCDL 110, which are separated by 90°, are connected to the inputs of four interpolators 130-1 through 130-4. Thus, each interpolator 130 receives two inputs that are separated by 90° and can provide an interpolated signal between the phase of the two inputs. For example, the first interpolator 130-1 may receive inputs of 0° and 90°, the second interpolator 130-2 may receive inputs of 90° and 180°, the third interpolator 130-3 may receive inputs of 180° and 270°, the fourth interpolator 130-4 may receive inputs of 270° and 360° (0°). The output of one interpolator 130 is selected by the quadrant multiplexer 150 to provide the output of the signal generator circuit 100 as the resulting spread spectrum or constantly offset frequency.

The signal generator circuit 100 allows for movement of the output phase by increments of the resolution of the interpolator 130. If the output phase is moved at a constant speed, this corresponds to a constant offset of the output frequency in respect to the PLL frequency. If the phase movement speed varies in time, then a changing frequency offset can be emulated, including a spread spectrum that assumes a triangle wave frequency change in time. It is noted that the frequency of the PLL 120 stays undisturbed, so the signal generator circuit 100 can share the same PLL 120 with other blocks that require constant frequency PLL output.

Figure 2:
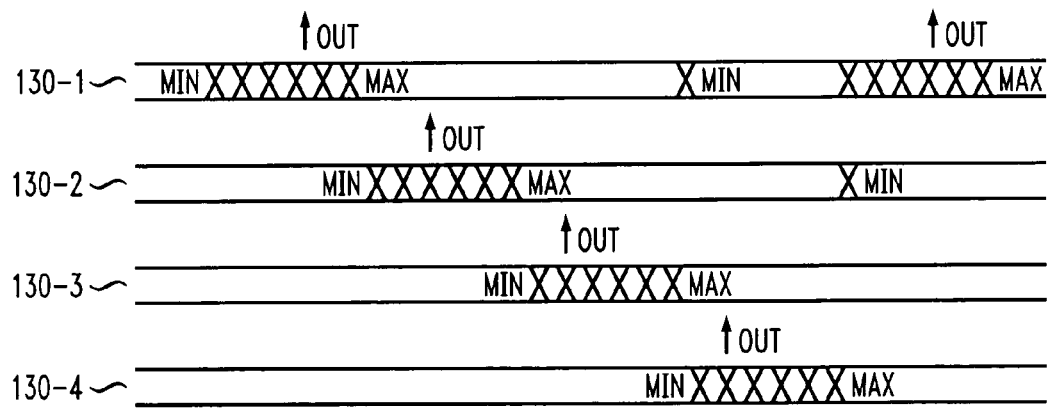
FIG. 2 is a timing diagram illustrating the generation of a frequency lower than the frequency of the PLL of FIG. 1.

FIG. 2 is a timing diagram illustrating the generation of a frequency lower than the frequency of the PLL 120. Generally, when the phase delay increases continuously, this will lead to generation of a frequency lower than PLL frequency. In order to increase the delay constantly one would start with multiplexing out the leftmost interpolator 130-1 in FIG. 1 with interpolation of the left (least delayed) input of the interpolator 130-1. Then the interpolation control would gradually move the phase of interpolated signal towards the right input (maximum delay) of the leftmost interpolator 130-1. When the leftmost interpolator 130-1 reaches its maximum delay interpolation, the multiplexer 150 will switch to the next interpolator 130-2 at its minimum delay, and so on. When the maximum delay of the rightmost interpolator 130-4 is reached, the multiplexer 150 switches to the output of interpolator 130-1 at its minimum delay. As discussed below in conjunction with FIG. 4, a control circuit for each interpolator 130 sets the next interpolator (e.g., the interpolator 130 that is to the right of the active interpolator 130) to a minimum delay value in order to be ready to take over.

Figure 3:
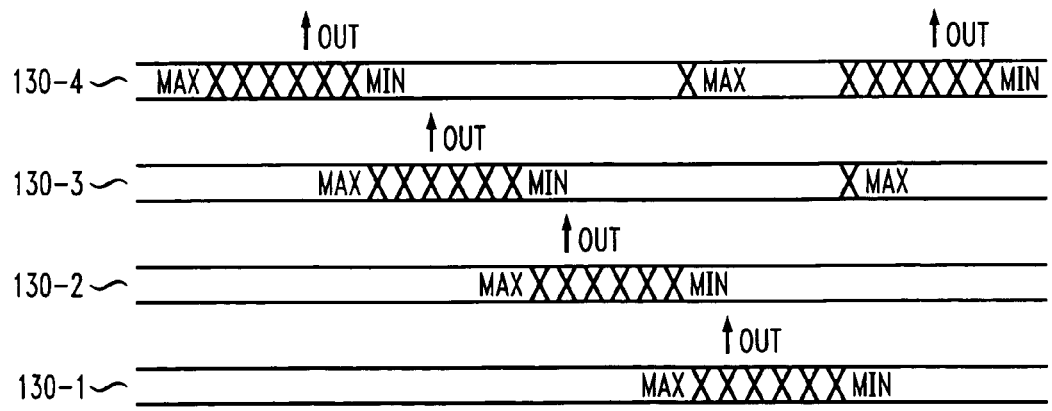
FIG. 3 is a timing diagram illustrating the generation of a frequency higher than the frequency of the PLL of FIG. 1.

FIG. 3 is a timing diagram illustrating the generation of a frequency higher than the frequency of the PLL 120. Generally, when the phase delay decreases continuously, this will lead to generation of a frequency higher than PLL frequency. In order to decrease the delay constantly one would start with multiplexing out the rightmost interpolator 130-4 in FIG. 1 with interpolation of the right (most delayed) input of the interpolator 130-4. Then the interpolation control would gradually move the phase of interpolated signal towards the left input (minimum delay) of the rightmost interpolator 130-4. When the rightmost interpolator 130-4 reaches its minimum delay interpolation, the multiplexer 150 will switch to the next interpolator 130-3 at its maximum delay, and so on. When the minimum delay of the leftmost interpolator 130-1 is reached, the multiplexer 150 again switches to the output of interpolator 130-4 at its maximum delay.

Figure 4:
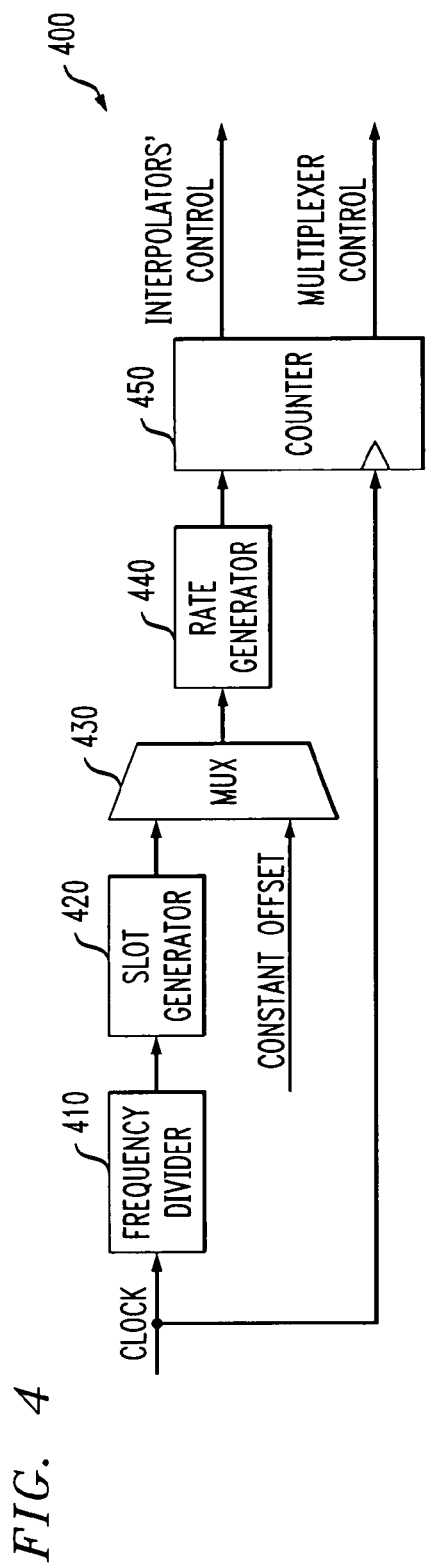
FIG. 4 is a block diagram illustrating a control circuit for the signal generator circuit of FIG. 1.

FIG. 4 is a block diagram illustrating a control circuit 400 for the signal generator circuit 100 of FIG. 1. As shown in FIG. 4, the control circuit 400 generates a control signal for the interpolators 130 (to select a given phase within the range of the active interpolator 130) and for the multiplexer 150 (to select the output of a given interpolator 130). The control circuit 400 includes a rate generator 440 that increments or decrements a counter 450 with a desired rate in order to facilitate higher or lower frequency generation. The lower bits of the counter 450 are used for control of the active interpolator 130 (inactive interpolators are kept static at a proper state), and the upper bits are used for control of the multiplexer 150.

The rate for rate generator 440 is set either from the constant offset control or from the slot generator 420 that changes control in time in order to achieve the desired frequency timing. For the spread spectrum, the timing diagram of the slot generator 420 must emulate a triangle wave, as discussed below in conjunction with FIG. 5. The number of slots can be programmed in the slot generator 420, and the duration of each slot can be set through the frequency divider 410, in a known manner. A multiplexer 430 selects either the constant offset value or the output of the slot generator.

Figure 5:
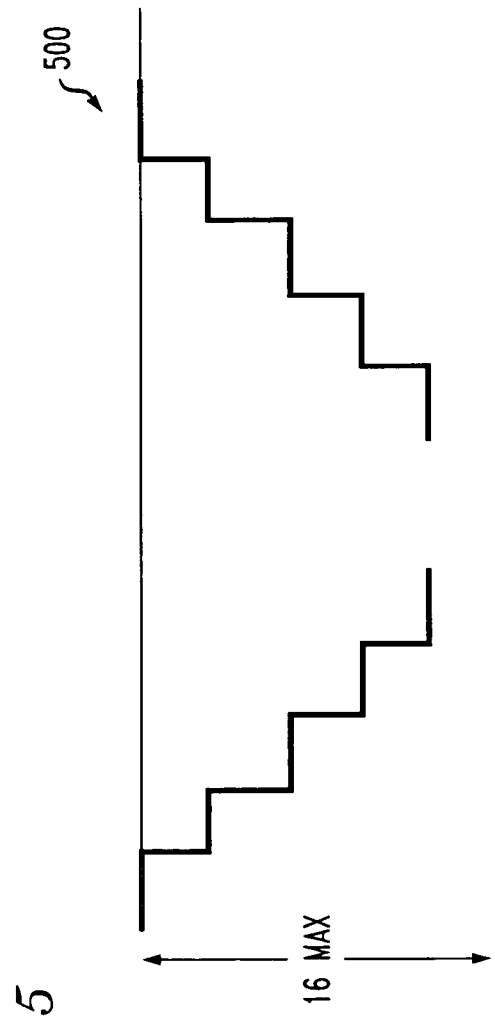
FIG. 5 is a timing diagram illustrating a control signal generated by the slot generator of FIG. 4.

FIG. 5 is a timing diagram illustrating a control signal 500 generated by the slot generator 420 of FIG. 4. The rate generator 440 has to assure a minimum phase jitter in the phase movements. In one exemplary embodiment, there are 16 clock periods over which the phase increment/decrement pattern repeats. Thus, each step in FIG. 5 corresponds to a different slot and likewise, to a different rate of phase increment/decrement by an interpolator 130. In other words, each step in the triangle wave control signal corresponds to a different rate of change in phase setting for the interpolators 130 and multiplexer 150. A table can be established to assign a different binary value to each slot.

Among other benefits, the present invention provides predominantly digital rate offset or spread spectrum generation based on the constant PLL frequency.

A plurality of identical die are typically formed in a repeated pattern on a surface of the wafer. Each die includes a device described herein, and may include other structures or circuits. The individual die are cut or diced from the wafer, then packaged as an integrated circuit. One skilled in the art would know how to dice wafers and package die to produce integrated circuits. Integrated circuits so manufactured are considered part of this invention.

It is to be understood that the embodiments and variations shown and described herein are merely illustrative of the principles of this invention and that various modifications may be implemented by those skilled in the art without departing from the scope and spirit of the invention.

We claim:
1. A spread spectrum generator circuit, comprising:
   a voltage controlled delay loop for generating a plurality of signals having a different phase, wherein a clock signal is applied to said voltage controlled delay loop;
   a plurality of interpolators for processing at least two of said signals; and at least one multiplexer for selecting an output of one of said interpolators as an output signal having a phase between a phase of said at least two of said signals, wherein said output is varied at a variable phase movement speed between a phase of said at least two of said signals to generate a spread spectrum signal, wherein said spread spectrum signal is generated using a continuous phase delay change, and wherein said spread spectrum signal has a frequency lower than said clock signal or a frequency higher than said clock signal.

2. The spread spectrum generator circuit of claim 1, wherein said voltage controlled delay loop is comprised of a plurality of delay elements.

3. The spread spectrum generator circuit of claim 1, wherein each of said interpolators has an associated phase range.

4. The spread spectrum generator circuit of claim 1, further comprising a control circuit that generates a triangle wave control signal for said at least one interpolator.

5. A method for generating a spread spectrum signal, comprising:
  generating a plurality of signals having a different phase by applying a clock signal to a voltage controlled delay loop;
  processing at least two of said signals using a plurality of interpolators; and
  selecting an output of one of said interpolators as an output signal having a phase between a phase of at least two of said signals, wherein said output is varied at a variable phase movement speed between a phase of said at least two of said signals to generate a spread spectrum signal, wherein said spread spectrum signal is generated using a continuous phase delay change, and wherein said spread spectrum signal has a frequency lower than said clock signal or a frequency higher than said clock signal.

6. The method of claim 5, wherein said generating step is performed by a plurality of delay elements.

7. The method of claim 5, wherein each of said interpolators has an associated phase range.

8. The method of claim 5, further comprising the step of generating a triangle wave control signal for at least one interpolator.

9. An integrated circuit, comprising:
  a spread spectrum generator circuit, comprising:
  a voltage controlled delay loop for generating a plurality of signals having a different phase, wherein a clock signal is applied to said voltage controlled delay loop;
  a plurality of interpolators for processing at least two of said signals; and
  at least one multiplexer for selecting an output of one of said interpolators as an output signal having a phase between a phase of said at least two of said signals, wherein said output is varied at a variable phase movement speed between a phase of said at least two of said signals to generate a spread spectrum signal, wherein said spread spectrum signal is generated using a continuous phase delay change, and wherein said spread spectrum signal has a frequency lower than said clock signal or a frequency higher than said clock signal.

10. The integrated circuit of claim 9, wherein said voltage controlled delay loop is comprised of a plurality of delay elements.

11. The integrated circuit of claim 9, wherein each of said interpolators has an associated phase range.

12. The integrated circuit of claim 9, further comprising a control circuit that generates a triangle wave control signal for said at least one interpolator.

* * * * *